United States Patent
Ko et al.

(10) Patent No.: US 7,489,985 B2
(45) Date of Patent: Feb. 10, 2009

(54) ROBOT CLEANER SYSTEM AND A METHOD FOR RETURNING TO EXTERNAL RECHARGING APPARATUS

(75) Inventors: Jang-Youn Ko, Gwangju (KR); Sam-Jong Jeung, Gwanju (KR); Jeong-Gon Song, Gwangju (KR); Ki-Man Kim, Gwangju (KR); Ju-Sang Lee, Gwangju (KR); Kwang-Soo Lim, Gemcheon-Gu (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 11/075,472

(22) Filed: Mar. 9, 2005

(65) Prior Publication Data

US 2006/0087273 A1    Apr. 27, 2006

(30) Foreign Application Priority Data

Oct. 27, 2004    (KR) ............... 10-2004-0086109

(51) Int. Cl.
*G05B 15/00*    (2006.01)

(52) U.S. Cl. ............ 700/259; 700/245; 318/568.12

(58) Field of Classification Search ......... 318/560–587, 318/568.12; 700/245, 259
See application file for complete search history.

(56) References Cited

U.S. PATENT DOCUMENTS

| | | | | |
|---|---|---|---|---|
| 4,777,416 A | * | 10/1988 | George et al. | 318/568.12 |
| 5,293,955 A | * | 3/1994 | Lee | 180/169 |
| 5,440,216 A | * | 8/1995 | Kim | 318/587 |
| 5,568,589 A | * | 10/1996 | Hwang | 706/52 |
| 5,787,545 A | * | 8/1998 | Colens | 15/319 |
| 6,389,329 B1 | * | 5/2002 | Colens | 700/262 |
| 6,496,754 B2 | * | 12/2002 | Song et al. | 700/245 |
| 6,748,297 B2 | * | 6/2004 | Song et al. | 700/259 |

(Continued)

FOREIGN PATENT DOCUMENTS

DE    69804253 T    11/2002

(Continued)

OTHER PUBLICATIONS

Official Action dated Jun. 15, 2006 issued from the Korean Intellectual Property Office with respect to Korean Patent Application No. 2005-38050 filed on May 6, 2005.

(Continued)

*Primary Examiner*—Walter Benson
*Assistant Examiner*—Antony M Paul
(74) *Attorney, Agent, or Firm*—Ohlandt, Greeley, Ruggiero & Perle, LLP.

(57) ABSTRACT

A robot cleaner system and a method for the robot cleaner to return to an external recharging apparatus. The robot cleaner system has an external recharging apparatus including a charging stand having a charging terminal, and a plurality of transmission parts for sending signals having different codes and strengths; a robot cleaner including a rechargeable battery, a connection terminal for connection with the charging terminal to supply power to the rechargeable battery, a receiving part for receiving signals from the plurality of transmission parts, and a control part for controlling a movement of the robot cleaner using the signals received by the receiving part, so that the connection terminal is connected to the charging terminal.

10 Claims, 9 Drawing Sheets

U.S. PATENT DOCUMENTS

| | | | |
|---|---|---|---|
| 6,859,010 B2* | 2/2005 | Jeon et al. | 320/109 |
| 6,883,201 B2* | 4/2005 | Jones et al. | 15/319 |
| 7,133,746 B2* | 11/2006 | Abramson et al. | 700/259 |
| 7,167,775 B2* | 1/2007 | Abramson et al. | 700/245 |
| 7,332,890 B2* | 2/2008 | Cohen et al. | 320/109 |
| 2002/0120364 A1 | 8/2002 | Colens | 700/262 |
| 2004/0111184 A1 | 6/2004 | Chiappetta et al. | 700/245 |
| 2004/0158354 A1* | 8/2004 | Lee et al. | 700/245 |

FOREIGN PATENT DOCUMENTS

| | | |
|---|---|---|
| DE | 10231391 | 2/2004 |
| EP | 1457151 | 7/2003 |
| EP | 1435555 | 12/2003 |
| JP | 2001525567 | 12/2001 |
| KR | 1020020079158 | 10/2002 |
| KR | 10-2004-0053653 | 6/2004 |
| KR | 10-2004-0063247 | 7/2004 |
| RU | 2 127 997 | 3/1999 |
| WO | WO2004/006034 | 1/2004 |

OTHER PUBLICATIONS

Preliminary Search report dated May 12, 2006 issued from French Patent Office in regards to French Patent Application No. 05 04476 filed on May 3, 2005.

Search report dated Jun. 12, 2006 issued from the Dutch Patent Office in regards to Dutch Patent Application No. 1028889 filed on Apr. 29, 2005.

Office Action dated May 16, 2007 from corresponding German Application No. 10 2005 020 311.6-15.

Combined Search and Examination Report issued from British Patent Office, date issued Jul. 15, 2005.

Office Action issued Jun. 19, 2007 for corresponding Japanese Application No. 2005-048327.

Office Action dated Jul. 12, 2006 issued from the Russian Patent Office with respect to corresponding Russian Patent Application No. 2005114218 filed on Apr. 29, 2005.

Office Action dated Sep. 15, 2006 issued from the Australian Patent Office with respect to Australian Patent Application No. 2005201674 filed on Apr. 20, 2005.

Swedish Office Action issued Oct. 7, 2005 in connection with Swedish Application No. 050913-9.

* cited by examiner

ROBOT CLEANER SYSTEM AND A METHOD FOR RETURNING TO EXTERNAL RECHARGING APPARATUS

CROSS-REFERENCE TO RELATED APPLICATIONS

This application claims the benefit of Korean Patent Application No. 2004-86109, filed Oct. 27, 2004, in the Korean Intellectual Property Office, the disclosure of which is incorporated herein by reference.

BACKGROUND OF THE INVENTION

1. Field of the Invention

The present invention relates to a robot cleaner system and a method of the robot cleaner to return to an external recharging apparatus. More particularly, the present invention relates to a robot cleaner system including a robot cleaner having a rechargeable battery and an external recharging apparatus for charging the battery, and a method for the robot cleaner to return to the external recharging apparatus.

2. Description of the Related Art

Generally, a robot cleaner automatically travels around an area of a predetermined range to clean a floor or a surface by drawing in dust and impurities without requiring a user's manipulation. The robot cleaner measures distances therefrom to obstacles such as furniture, office supplies and walls in the cleaning area and travels around without colliding with the obstacles using information on the measured distance, thereby performing a cleaning work as instructed.

The robot cleaner includes a battery for supplying electric power for driving. Rechargeable batteries are generally used to reuse the battery after being exhausted. Therefore, the robot cleaner needs an external recharging apparatus for charging the battery with electric power. The robot cleaner system includes the robot cleaner and the external recharging apparatus.

In order for the robot cleaner to automatically return to the external recharging apparatus, the robot cleaner needs to correctly perceive a location of the external recharging apparatus.

Among various methods for the robot cleaner to perceive the location of the external recharging apparatus and connecting with the external recharging apparatus, one example is as follows. The external recharging apparatus, having a charging terminal for connection with the robot cleaner, comprises a charging apparatus mark, whereas the robot cleaner comprises a mark sensor. Usually, a reflective optical sensor is used for the charging apparatus mark. The reflective optical sensor comprises a light emitting part and a light receiving part for receiving a light reflected from the charging apparatus mark. When the robot cleaner would return to the external recharging apparatus after finishing the cleaning work or after exhausting the battery, the light emitting part provided to the robot cleaner emits a light, and the light receiving part of the reflective optical sensor receives the light reflected from the charging apparatus mark mounted to the external recharging apparatus. Therefore, the robot cleaner recognizes the location of the external recharging apparatus and returns to the external recharging apparatus.

However, the reflective optical sensor, used for the robot cleaner system having the external recharging apparatus, is expensive. Further, the robot cleaner takes a long time to return to the external recharging apparatus because of a short distance that the optical sensor can perceive.

SUMMARY OF THE INVENTION

An aspect of the present invention is to solve at least the above problems and/or disadvantages and to provide at least the advantages described below. Accordingly, an aspect of the present invention is to provide a robot cleaner system improved in manufacturing cost and ability of a sensor for perceiving a distance to obstacles, and a method of the robot cleaner to return to an external recharging apparatus.

In order to achieve the above-described aspects of the present invention, there is provided a robot cleaner system comprising an external recharging apparatus including a charging stand having a charging terminal, and a plurality of transmission parts for sending signals having different codes and strengths; a robot cleaner including a rechargeable battery, a connection terminal for connection with the charging terminal to supply power to the rechargeable battery, a receiving part for receiving signals from the plurality of transmission parts, and a control part for controlling a movement of the robot cleaner using the signals received by the receiving part, so that the connection terminal is connected to the charging terminal.

The long-distance transmitters are provided on opposite sides of the charging stand, and the short-distance transmitter is disposed in between of the long-distance transmitters.

The long-distance transmitters and the short-distance transmitter are substantially linearly arranged.

The long-distance transmitters and the short-distance transmitter each transmit signals to different sending angle ranges in different directions, and the sending angle range of the short-distance transmitter is narrower than that of the long-distance transmitter.

The transmission part further comprises a docking induction transmitter disposed at a certain location of the charging stand to generate signals having a different code, a minor strength and a narrower sending angle range compared to the signals of the short-distance transmitter.

The docking induction transmission part is disposed above or below the short-distance transmitter at a certain distance.

The plurality of transmission parts may comprise an infrared emitting element.

Another aspect of the present invention is to provide a method for a robot cleaner to return to an external recharging apparatus, so that a connection terminal of the robot cleaner is connected to a charging terminal of a charging stand, the method comprising the steps of a) receiving a charge request signal while the robot cleaner is traveling and cleaning a certain area as instructed by a user; b) upon receiving infrared signals containing different codes and strengths, analyzing the different codes included in the infrared signals and controlling the robot cleaner to approach the charging stand; and c) connecting the connection terminal of the robot cleaner to the charging terminal of the charging stand.

The step b) comprises the steps of d) the robot cleaner receiving the infrared signals and moving straight toward a front of the charging stand; e) if the infrared signals are not received during the straight movement, the robot cleaner rotating to the left or right by approximately 90° and keeps the straight moving until the infrared signals are received; f) upon receiving the infrared signals, the robot cleaner rotates by approximately 90° to direct the front of the charging stand and moves straight; and g) upon receiving infrared signals containing a different code from the received infrared signal, the robot cleaner obliquely advancing toward the charging stand.

In step c), upon receiving infrared signals having a yet different code from the different code during the oblique movement, the robot cleaner moves straight toward the front of the charging stand so that the connection terminal of the robot cleaner is connected to the charging terminal of the charging stand.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

With reference to FIGS. 1 to 4, a robot cleaner system comprises a robot cleaner 100 and an external recharging apparatus 200.

Figure 1:
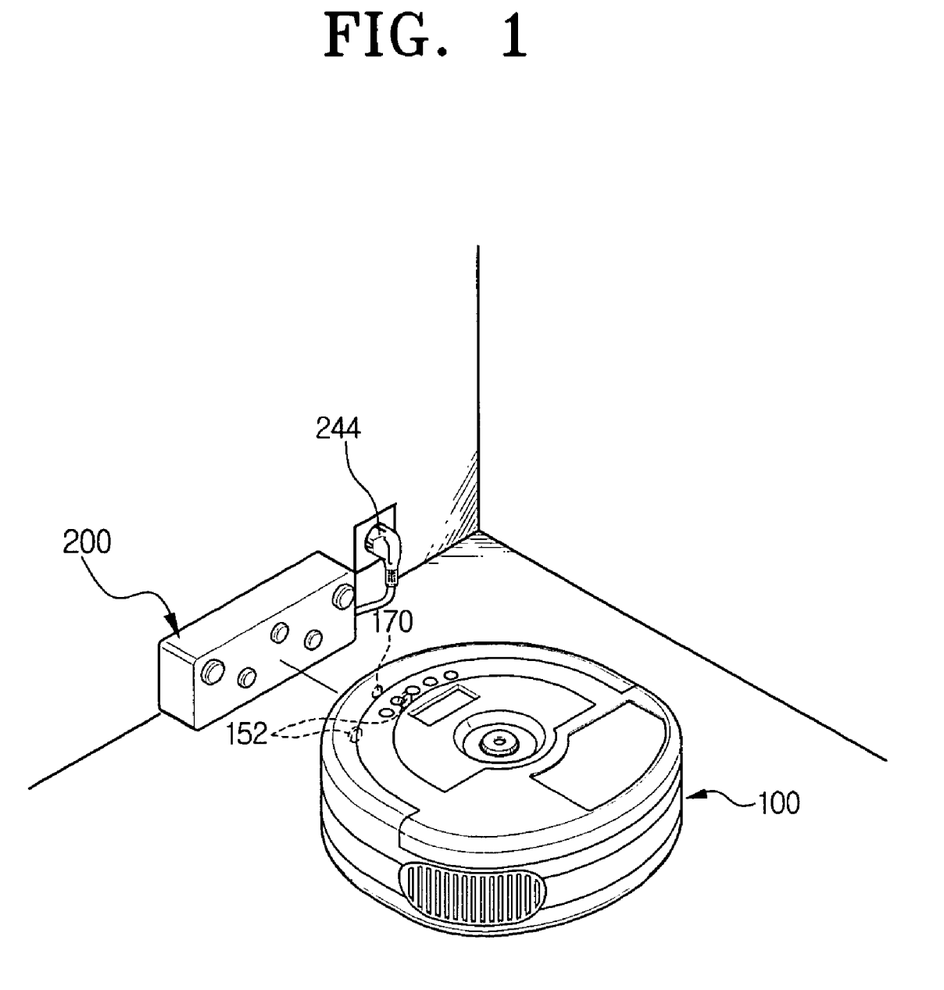
FIG. 1 is a perspective view schematically showing a robot cleaner system according to an embodiment of the present invention.
Figure 2:
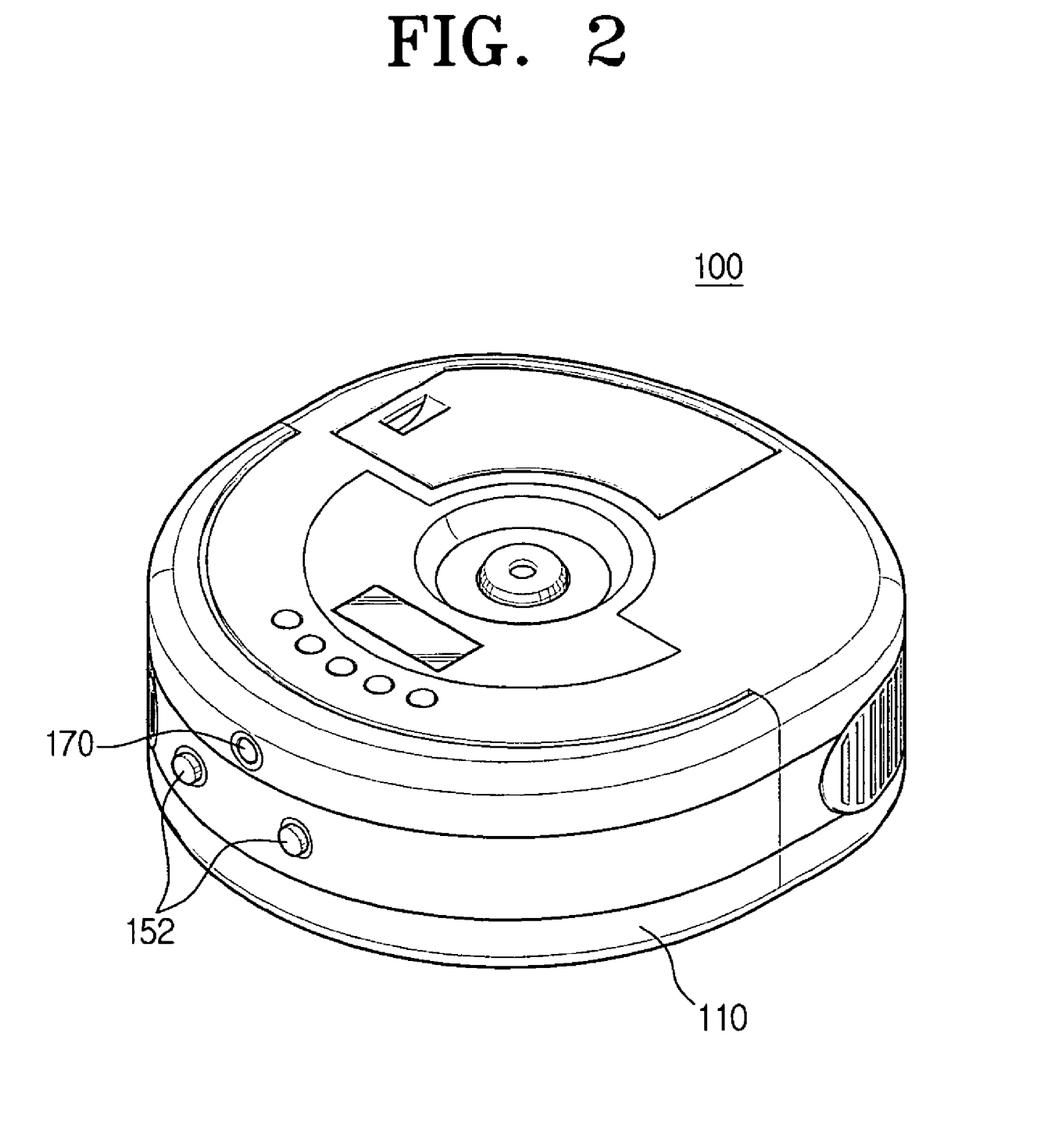
FIG. 2 is a schematic perspective view of a robot cleaner of FIG. 1.
Figure 3:
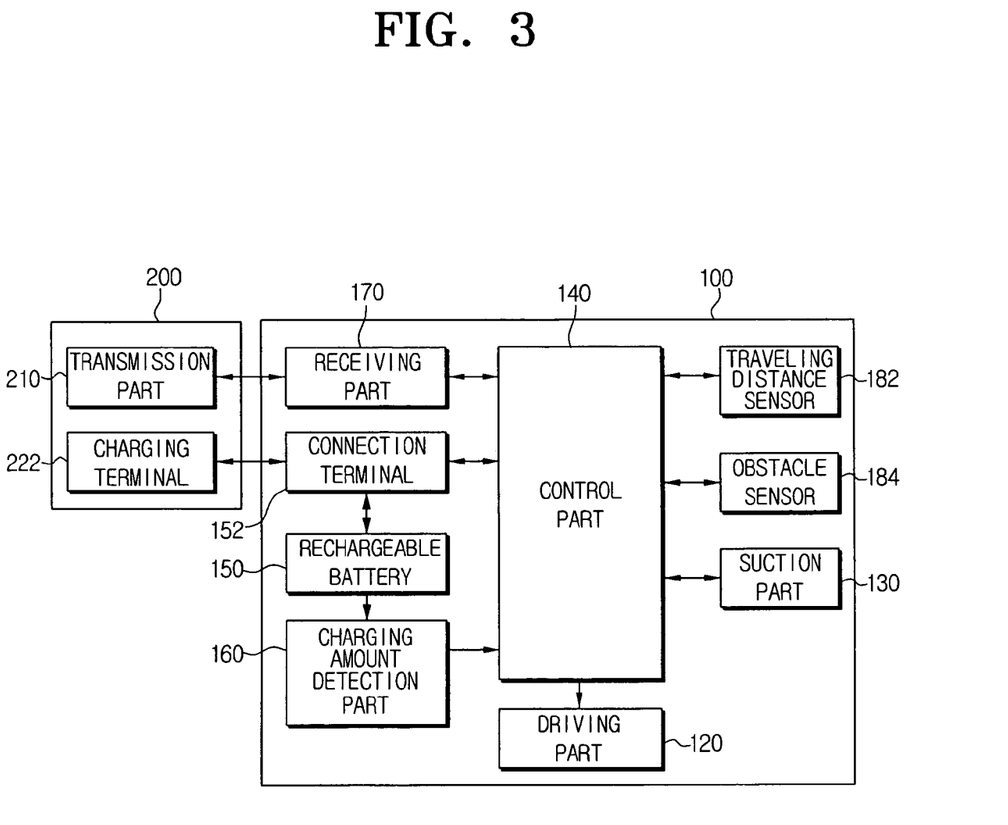
FIG. 3 is a block diagram of the robot cleaner system of FIG. 1.

The robot cleaner 100 comprises a cleaner body 110, a suction part 130, a driving part 120, an obstacle sensor 184, a traveling distance sensor 182, a connection terminal 152, a rechargeable battery 150, a receiving part 170 and a control part 140.

The suction part 130 is mounted to the cleaner body 110 to draw in dust-laden air from a surface to be cleaned. The suction part 130 can be structured in various methods. For example, the suction part 130 may comprise a suction motor (not shown) and a dust-collecting chamber for collecting therein dust drawn in by the suction motor through a suction inlet or a suction pipe facing the surface being cleaned.

The driving part 120 comprises wheels (not shown) mounted on opposite sides of the cleaner body 110 and driving motors for driving the respective wheels. The driving part 120 rotates the driving motors clockwise or counterclockwise according to a controlling signal from the control part 140. Driving directions are determined by varying revolutions per minute (RPM) of the respective driving motors.

The obstacle sensor 184 perceives obstacles or walls in front or in a moving direction and detects a distance therefrom to the obstacles or the walls. An infrared sensor or a ultrasonic sensor can be applied for the obstacle sensor 184.

The traveling distance sensor 182 may comprise a rotation sensor for detecting the RPM of the wheels. For example, a rotary encoder can be applied for the rotation sensor to detect the RPM of the driving motors.

Figure 4:
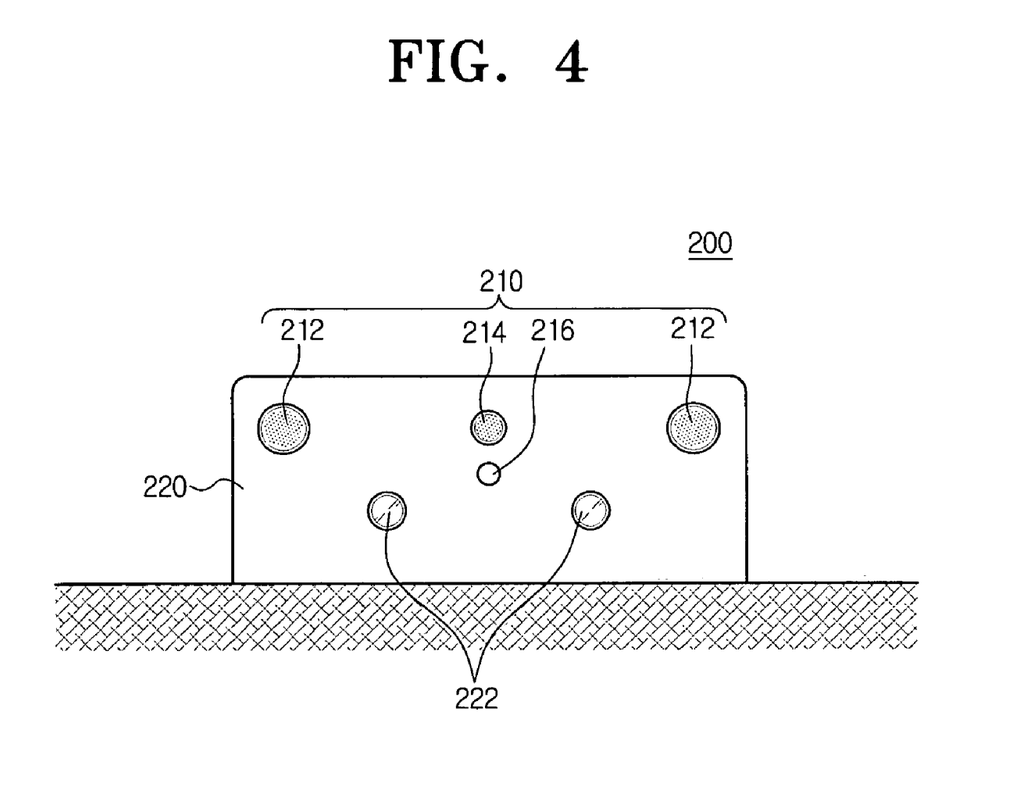
FIG. 4 is a front view of an external recharging apparatus of FIG. 1.

In the illustrated embodiment, a pair of the connection terminals 152 are formed on a front of the robot cleaner at heights corresponding to charging terminals 222 of the external recharging apparatus 200. However, when the common alternating current (AC) power source is a three-phase power source, three connection terminals 152 and charging terminals 222 are provided.

The rechargeable battery 150 is mounted on the cleaner body 110 and connected to the connection terminal 152. Therefore, when the connection terminal 152 is connected to the charging terminal 222 of the external recharging apparatus 200, the rechargeable battery 150 is charged by the common AC power source. In other words, when the robot cleaner 100 is connected to the external recharging apparatus 200, power is led in through a power cord 244 (FIG. 1) connected to the common AC power source and supplied from the charging terminal 222 of the external recharging apparatus 200 to the rechargeable battery 150 through the connection terminal 152 of the cleaner body 110.

A charging amount detection part 160 detects a charging amount of the rechargeable battery 150 and transmits a charge requesting signal to the control part 140 if the detected amount reaches a lower limit as set.

The receiving part 170 is mounted on a front of the cleaner body 110 to receive signals having different codes transmitted from a transmission part 210, which will be described later, of the external recharging apparatus 200.

The control part 140 controls above-described parts of the robot cleaner 100, thereby performing the cleaning work. When the robot cleaner 100 is not in use, the control part 140 controls the respective parts such that the robot cleaner 100 stands by, charging the rechargeable battery 150 in connection with the external recharging apparatus 200. According to the above, the charging amount in the rechargeable battery 150 can be maintained within a certain range.

After the robot cleaner 100, being separated from the external recharging apparatus 200, completes the cleaning work, the control part 140 helps the robot cleaner 100 return to and connect with the external recharging apparatus 200 using the signals transmitted from the transmission part 210 of the external recharging apparatus 200. More specifically, the control part 140 detects the signals having different codes, received by the receiving part 170, and outputs a control code preset according to the codes of the received signals. Then, the control part 140 compares the output signal with a preset reference value to output a digital signal based on the comparison result. According to the output digital signal, the control part 140 controls the driving part 120 so that the robot cleaner 100 can return to a charging stand 220 of the external recharging apparatus 200.

Referring to FIG. 4, the external recharging apparatus 200 comprises the charging stand 220 including the charging terminal 222 and a transmission part 210. The charging terminal 222 is connected to the power cord 244 through an internal transformer, a converter and a power cable, and supplies the power to the rechargeable battery 150, in connection with the connection terminal 152 of the robot cleaner 100. The charging stand 220 supports the charging terminal 222 so that the charging terminal 222 is disposed at height corresponding to the connection terminal 152 of the robot cleaner 100, and fixes the charging terminal 222 on a certain position. When the common AC power source is the three-phase power source, three charging terminals 222 are mounted on the charging stand 220.

The transmission part 210 is mounted on a front of the charging stand 220 so that the receiving part 170 of the robot cleaner can recognize the signals sent from the transmission part 210. The transmission part 210 comprises a pair of long-distance transmitters 212 for sending signals of various strengths, a short-distance transmitter 214 and a docking induction transmitter 216. Each long-distance transmitter 212 is formed on opposite sides of the charging stand 220. The short-distance transmitter 214 and the docking induction transmitter 216 are preferably disposed in between the long-distance transmitters 212, that is, approximately in the middle of the charging stand 220. In order for the receiving part 170 of the robot cleaner 100 to receive the signals well, the long-distance transmitters 212 and the short-distance transmitter 214 are linearly disposed. Also, the docking induction transmitter 216 is disposed above or below the short-distance transmitter 214 at a predetermined distance not to be overlapped with the short-distance transmitter 214. The plurality of transmission parts 210 are preferably implemented by an infrared emitting element that generates an infrared signal, such as a general light emitting diode (LED). For the receiving part 170 of the robot cleaner 100, a photo diode which is a light-receiving sensor, a phototransistor and a PIN photo-diode may be used.

The long-distance transmitters 212, the short-distance transmitter 214 and the docking induction transmitter 216 send signals of respectively different codes, such that the receiving part 170 of the robot cleaner 100 can discriminatively receive the respectively different signals. The codes can be varied, for example, by changing a size or a shape of a wave of the infrared signal transmitted from the respective transmitters 212, 214 and 216.

Figure 5:
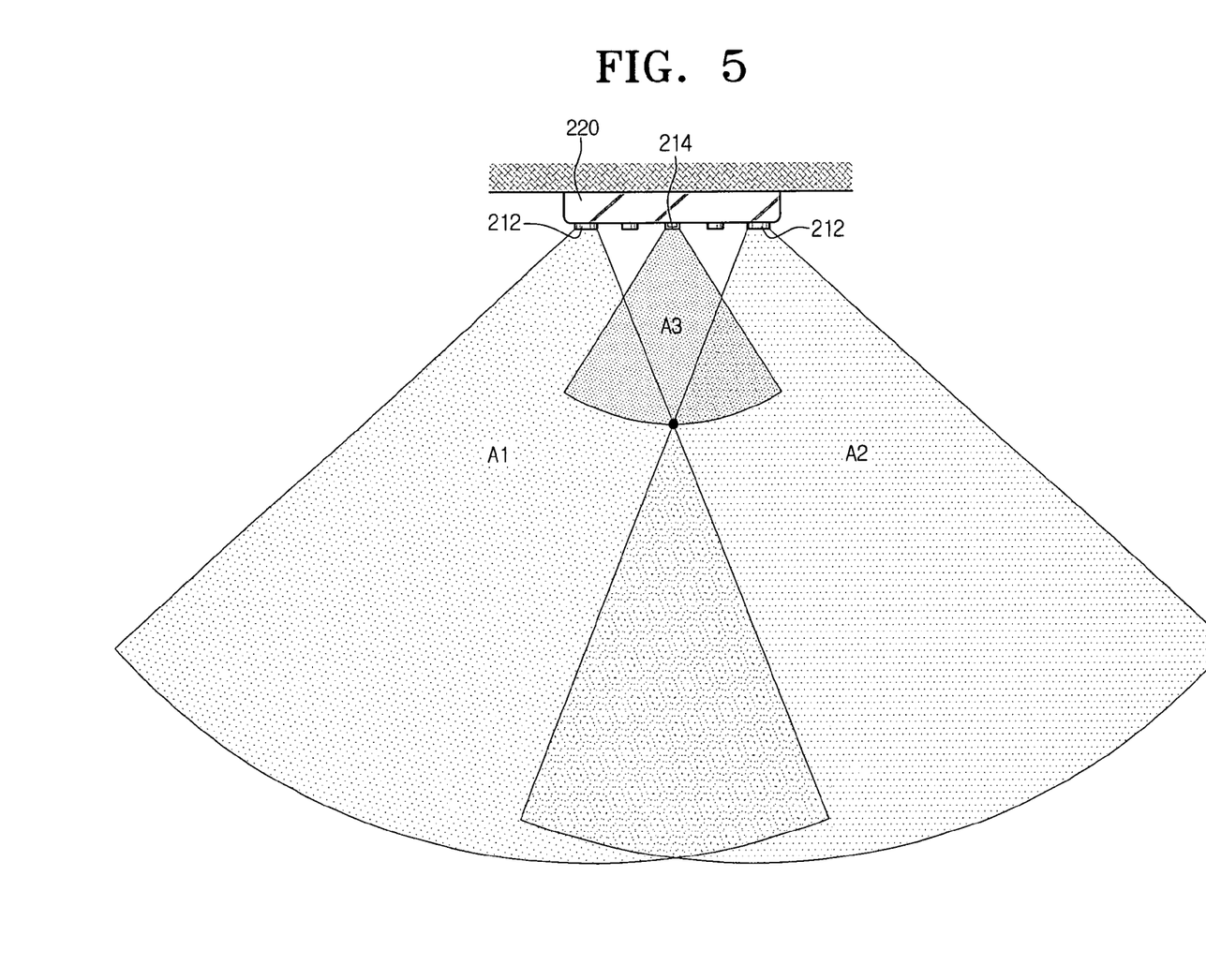
FIGS. 5 and 6 are views showing a transmission range of a plurality of transmitters of FIG. 4.
Figure 6:
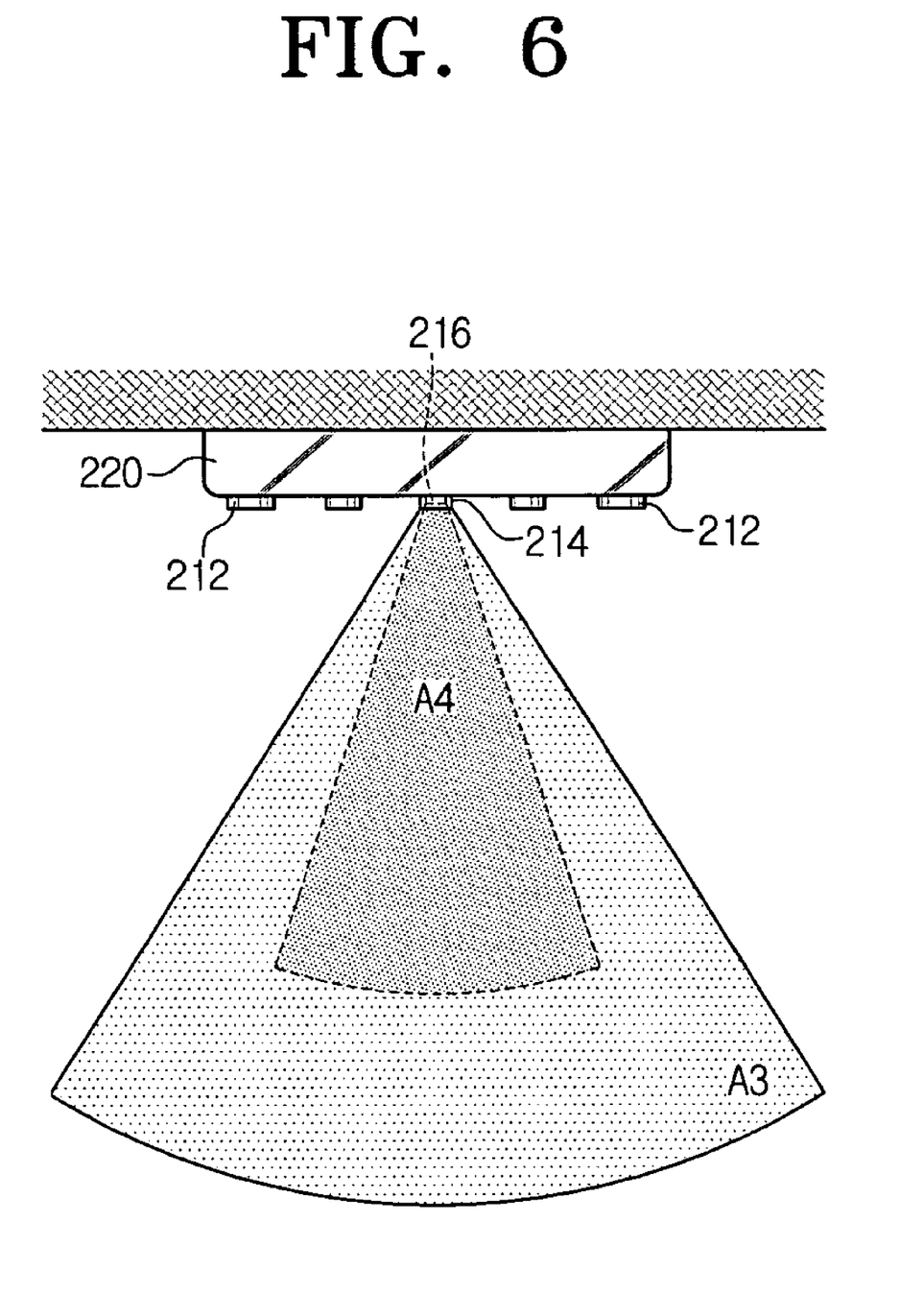

Referring to FIGS. 5 and 6, the long-distance transmitters 212, the short-distance transmitter 214 and the docking induction transmitter 216 are set to send the signals having respectively different strengths and angles of transmission. The strength of the signals of the plurality of transmitters 212, 214 and 216 can be set different by controlling resistances of the respective infrared emitting elements. Accordingly, the output current can be controlled, thereby the strengths of the signals can be varied. Reference numerals A1 to A4 denote the strength and the angle of transmission (hereinbelow, referred to as "transmission range") of the signals from the transmitters 212, 214 and 216. Specifically, A1 and A2 denote the transmission ranges of the long-distance transmitters 212, A3 denotes the transmission range of the short-distance transmitter 214, and A4 denotes the transmission range of the docking induction transmitter 216. As shown in FIGS. 5 and 6, the magnitude of the transmission ranges is in order of the long-distance transmitter 212, the short-distance transmitter 214 and the docking induction transmitter 216. Thus, the transmission ranges A1 and A2 of the long-distance transmitter 212 has the largest magnitude, the transmission range A4 of the docking induction transmitter 216 has the smallest magnitude, and the transmission range A3 of the short-distance transmitter 214 has magnitude between that of transmission ranges A1/A2 and A3.

Therefore, when returning to the external recharging apparatus 200, the robot cleaner 100 perceives the signals sent from the long-distance transmitter 212 for the first time and approaches the charging stand 220. Since the long-distance transmitter 212 and the short-distance transmitter 214 transmit the signals of different codes in an area where the signals from the long-distance transmitter 212 and the short-distance transmitter 214 are mixed, in other words, in an area where the ranges of A1, A2 and A3 are overlapped, the control part 140 of the robot cleaner 100 is able to discriminate the different signals received by the receiving part 170. The transmission range A4 of the signals sent from the docking induction transmitter 216 is set to be smaller than the transmission range A3 of the signals sent from the short-distance transmitter 214. After the robot cleaner 100 approaches the charging stand 220 by a predetermined distance, the connection terminal 152 of the robot cleaner 100 is connected to the charging terminal 222 of the charging stand 220. Here, the range of sending angle of the docking induction transmitter 216 is controlled to be small, such that the receiving part 170 of the robot cleaner 100 receives the signals from the docking induction transmitter 216 only in a limited area A4. Accordingly, the connection terminal 152 of the robot cleaner 100 can be correctly connected to the charging terminal 222.

Figure 7:
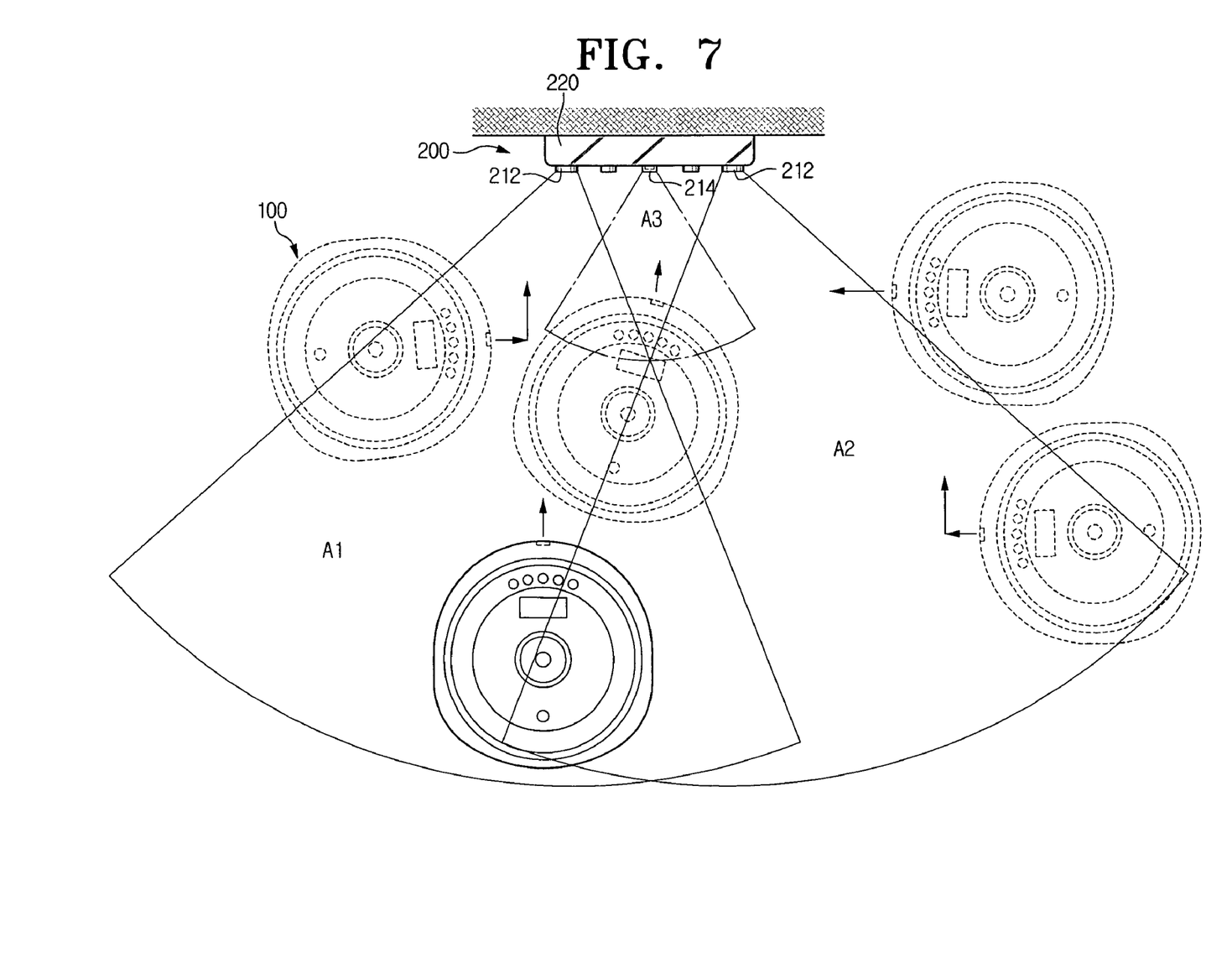
FIGS. 7 and 8 are views showing a returning operation of the robot cleaner to an external recharging apparatus.
Figure 8:
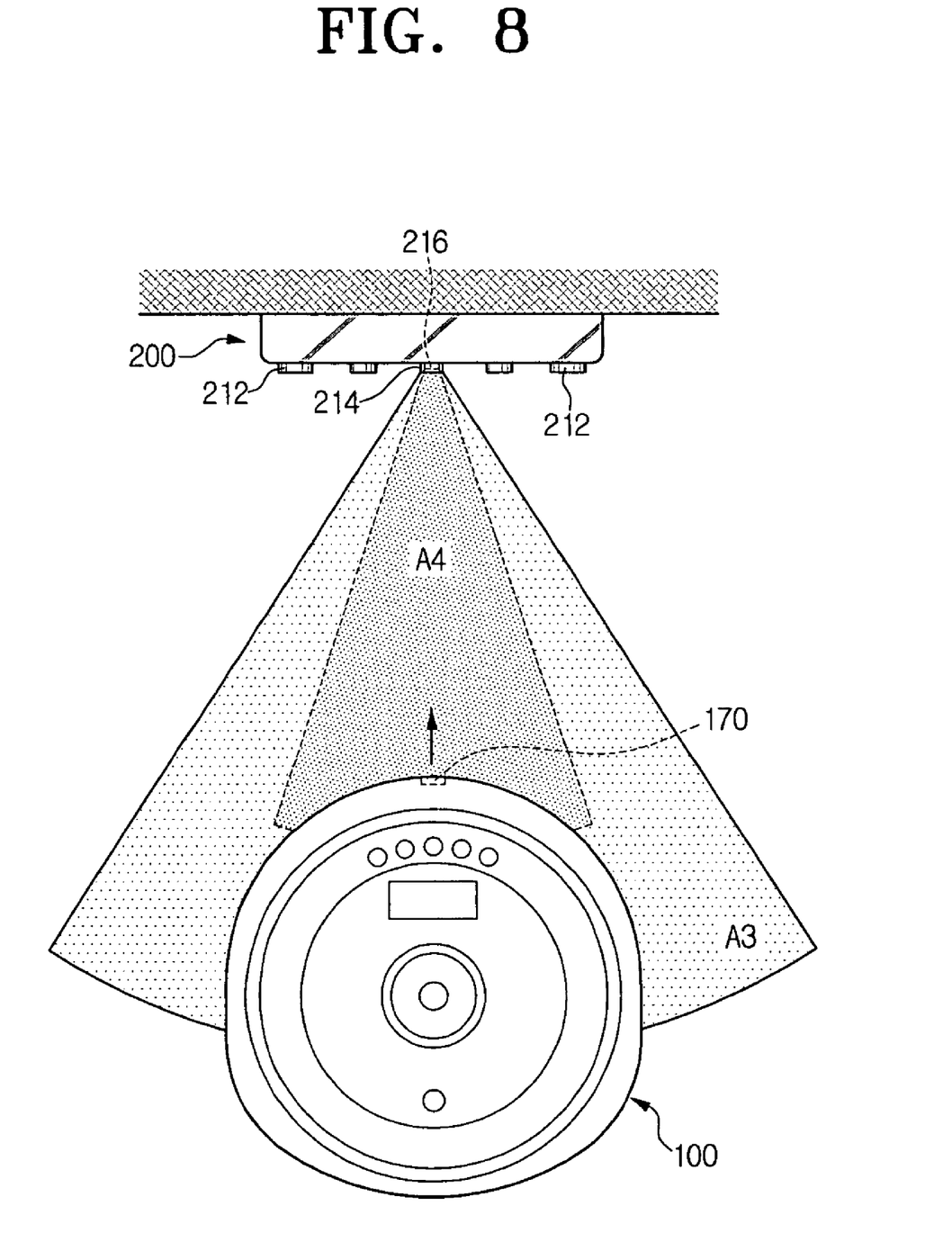
Figure 9:
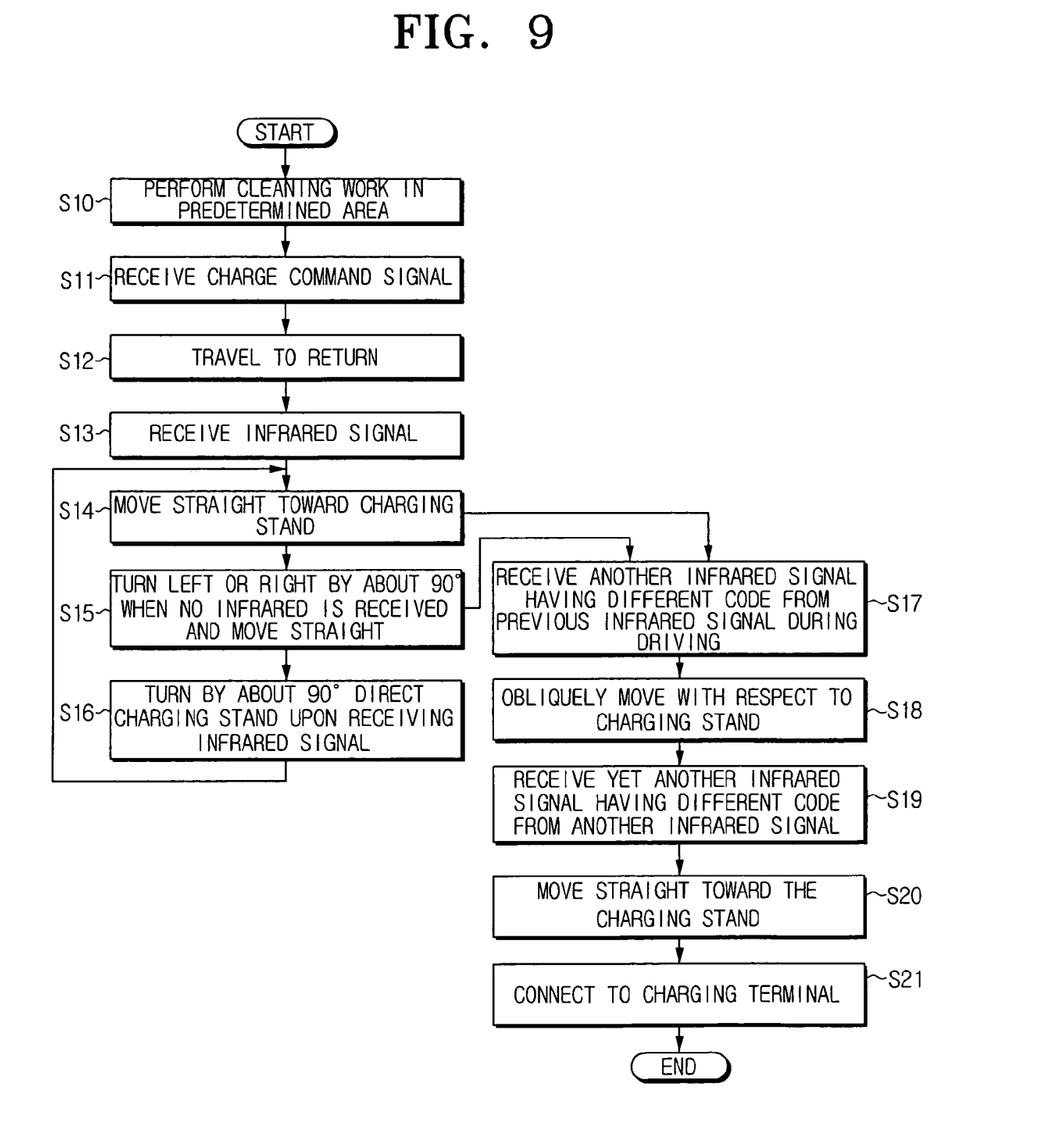
FIG. 9 is a block diagram for showing a method for the robot cleaner to return to the external recharging apparatus, according to an embodiment of the present invention.

Hereinbelow, a method of the robot cleaner 100 for returning to the external recharging apparatus 200 will be described with reference to FIG. 7 through FIG. 9.

In a state that the robot cleaner system having the external recharging apparatus 200 is initially installed, the robot cleaner 100 stands by with the connection terminal 152 connected to the charging terminal 222 of the external recharging apparatus 200. Upon receiving a cleaning work requesting signal, the robot cleaner 100 is separated from the external recharging apparatus 200 and cleans an area determined by a user's command (S10).

Upon receiving a charge request signal during the cleaning work (S11), the control part 140 of the robot cleaner 100 changes to a returning mode for returning to the charging stand 220 (S12). The control part 140 keeps the robot cleaner 100 traveling to receive the signals transmitted from the transmission part 210 of the charging stand 220. A variety of manners can be employed for the returning mode of the robot cleaner 100. For example, the robot cleaner 100 may move in zigzag-like or back-and-forth manner until the receiving part 170 receives the signals sent from the transmission pat 210.

The charge request signal is generated when the robot cleaner 100 finishes the cleaning work, or when the charge request signal is input from the charging amount detection part 160 during the cleaning work. Alternatively, the user may forcibly generate the charge request signal using a remote controller during the cleaning work.

When the robot cleaner 100 approaches the transmission range A1 or A2 of the infrared signals sent from the long-distance transmitters 212 of the transmission part 210, the transmission part 170 receives the signals (S13), and the control part 140 controls the robot cleaner 100 to approach the charging stand 220 of the external recharging apparatus 200. More specifically, the control part 140 controls the receiving part 170 to rotate towards the charging stand 220 and controls the robot cleaner 100 to go straight toward the charging stand 220 (S14).

If the robot cleaner 100 gets beyond the transmission ranges A1 or A2 of the infrared signals while moving toward the charging stand 220, the robot cleaner 100 rotates to the right or left by about 90° and moves straight (S15). When the robot cleaner 100 receives the infrared signals from the long-distance transmitter 212 during the straight movement, the robot cleaner 100 rotates again by almost 90° to again rotate towards the charging stand 220 (S16) and goes straight toward the front of the charging stand 220.

When the robot cleaner 100 is disposed in the transmission range A3 of the infrared signals sent from the short-distance transmitter 214 while moving straight towards the charging stand 220, the receiving part 170 is able to receive the infrared signals (S17). Because the short-distance transmitter 214 and the long-distance transmitter 212 transmit the infrared signals having different infrared codes from each other, the control part 140 can discriminate the infrared signals of the different codes, received by the receiving part 170.

When the receiving part 170 receives the infrared signals from the short-distance transmitter 214, the control part 140 controls the robot cleaner 100 to advance obliquely by approximately 45° toward the charging stand 220 (S18). The angled movement of the robot cleaner 100, instead of a straight movement, is to allow the robot cleaner 100 to promptly access the charging stand 220 by reducing an error which may be caused due to the relatively narrow transmission range A3 of the short-distance transmitter 214.

When the robot cleaner 100 receives the infrared signals from the docking induction transmitter 216, being located within the transmission range A4 (S19), the control part 140 controls the robot cleaner 100 to rotate toward the charging stand 220 so that the robot cleaner moves straight toward the charging stand 220 (S20).

According to the above, the robot cleaner 100 can promptly and correctly access and connect to the charging terminal 222 of the charging stand 220 (S21).

As can be appreciated from the above description of the robot cleaner system, according to an embodiment of the present invention, the plurality of transmission parts are provided to vary the codes and strengths of the respective signals output to the external recharging apparatus 200, so that the receiving part 170 and the control part 140 receives and analyzes the respectively different signals. Consequently, the robot cleaner 100 is able to swiftly return to the external recharging apparatus 200.

Furthermore, according to an embodiment of the present invention, the receiving part 170 of the robot cleaner 100 directly receives the infrared signals from the transmission part 210 of the external recharging apparatus 200. Unlike the conventional method of indirect reception of signals, the direct receiving method enables an improved sensing distance and low manufacturing cost.

While the invention has been shown and described with reference to certain embodiments thereof, it will be understood by those skilled in the art that various changes in form and details may be made therein without departing from the spirit and scope of the invention as defined by the appended claims.

What is claimed is:

1. A robot cleaner system comprising:
    a first transmitter generating first infrared signals, the first transmitter being associated with an external apparatus;
    a second transmitter generating second infrared signals, the second transmitter being associated with the external apparatus, the second infrared signals having less strength than the first infrared signals and having a different code than the first infrared signals, wherein the codes of the infrared signals differ in wave size or shape;
    a receiving part simultaneously receiving the first and second infrared signals, the receiving part being associated with a robot cleaner; and
    a control part for controlling a movement of the robot cleaner based upon the first and second infrared signals so that the robot cleaner is moved to a desired position with respect to the external apparatus.

2. The robot cleaner system of claim 1, wherein the first transmitter comprises a pair of first transmitters provided on a face of the external apparatus.

3. The robot cleaner system of claim 2, wherein the second transmitter is on the face between the pair of first transmitters.

4. The robot cleaner system of claim 1, wherein the first signals have a first angle range and the second signals have a second angle range, and the second angle range being narrower than the first angle range.

5. The robot cleaner system of claim 1, further comprising a third transmitter generating third signals, the third transmitter being associated with the external apparatus, the third signals having less strength than the second signals.

6. The robot cleaner system of claim 5, wherein the first signals have a first angle range, the second signals have a second angle range, and the third signals have a third angle range, wherein in the second angle range is narrower than the first angle range and the third angle range is narrower than the second angle range.

7. The robot cleaner system of claim 5, wherein the third signals have a different code from the first infrared signals and the second infrared signals, and the codes of the infrared signals differ in wave size or shape.

8. The robot cleaner system of claim 5, wherein a plurality of second transmitters or a plurality of third transmitters are provided.

9. The robot cleaner system of claim 8, wherein the plurality of second transmitters are disposed on the front and both sides of the external apparatus.

10. The robot cleaner system of claim 5, wherein the third signals have a different code from the first infrared signals and the second infrared signals.

* * * * *